United States Patent [19]
Malek

[11] Patent Number: 4,815,128
[45] Date of Patent: Mar. 21, 1989

[54] GATEWAY SYSTEM AND METHOD FOR INTERCONNECTING TELEPHONE CALLS WITH A DIGITAL VOICE PROTECTED RADIO NETWORK

[75] Inventor: Charles J. Malek, Crystal Lake, Ill.

[73] Assignee: Motorola, Inc., Schaumburg, Ill.

[21] Appl. No.: 881,990

[22] Filed: Jul. 3, 1986

[51] Int. Cl.$^4$ .............................................. H04L 9/00
[52] U.S. Cl. ........................................... 380/9; 380/49
[58] Field of Search ............ 455/26; 179/1.5 S, 1.5 R, 179/2 DD; 379/58–60, 63; 370/94; 380/23–25, 21, 49, 9

[56] References Cited

U.S. PATENT DOCUMENTS

| | | | |
|---|---|---|---|
| 3,639,690 | 2/1972 | Braun et al. | 179/1.5 R |
| 4,167,700 | 9/1979 | Coe et al. | 179/1.5 R |
| 4,182,933 | 1/1980 | Rosenblum | 179/1.5 R |
| 4,227,253 | 10/1980 | Ehrsam et al. | 380/25 |
| 4,228,321 | 10/1980 | Flanagan | 179/1.5 S |
| 4,305,152 | 12/1981 | Asakawa et al. | 455/26 |
| 4,330,689 | 5/1982 | Kang et al. | 380/9 |
| 4,351,984 | 9/1982 | Young et al. | 179/7 R |
| 4,368,357 | 1/1983 | Gurak | 179/1.5 R |
| 4,398,062 | 8/1983 | McRae et al. | 179/1.5 E |
| 4,411,017 | 10/1983 | Talbot | 455/26 |
| 4,419,756 | 12/1983 | Cheng-Quispe et al. | 179/2 DD |
| 4,423,287 | 12/1983 | Zeidler | 380/25 |
| 4,440,976 | 4/1984 | Bocci et al. | 179/1.5 R |
| 4,549,308 | 10/1985 | Lo Pinto | 455/26 |
| 4,555,805 | 11/1985 | Talbot | 455/26 |
| 4,578,530 | 3/1986 | Zeidler | 380/25 |
| 4,608,685 | 8/1986 | Jain et al. | 370/94 |
| 4,652,698 | 3/1987 | Hale et al. | 380/24 |

FOREIGN PATENT DOCUMENTS

0112697 7/1984 European Pat. Off.
58-81349 5/1983 Japan.

*Primary Examiner*—Salvatore Cangialosi

[57] ABSTRACT

A Gateway apparatus and method is disclosed which permits secure, end-to-end communications to exchange automatically between predetermined authorized subscribers operating on a radio network and a telephone network. The Gateway determines whether clear or coded message signals are to be routed from one network to another without utilizing an intervening decryption and encryption to accomplish the interconnection. The Gateway includes a radio network interface, a telephone network interface, a signal processor, and a supervisory controller. A Remote Interface at the location of the predetermined telephone subscriber is utilized to adapt a conventional telephone for clear and coded modes of operation. Moreover, an alternate embodiment is disclosed which permits two radio networks to be interconnected via the telephone network by utilizing two Gateways.

14 Claims, 8 Drawing Sheets

FIG. 1 —PRIOR ART—

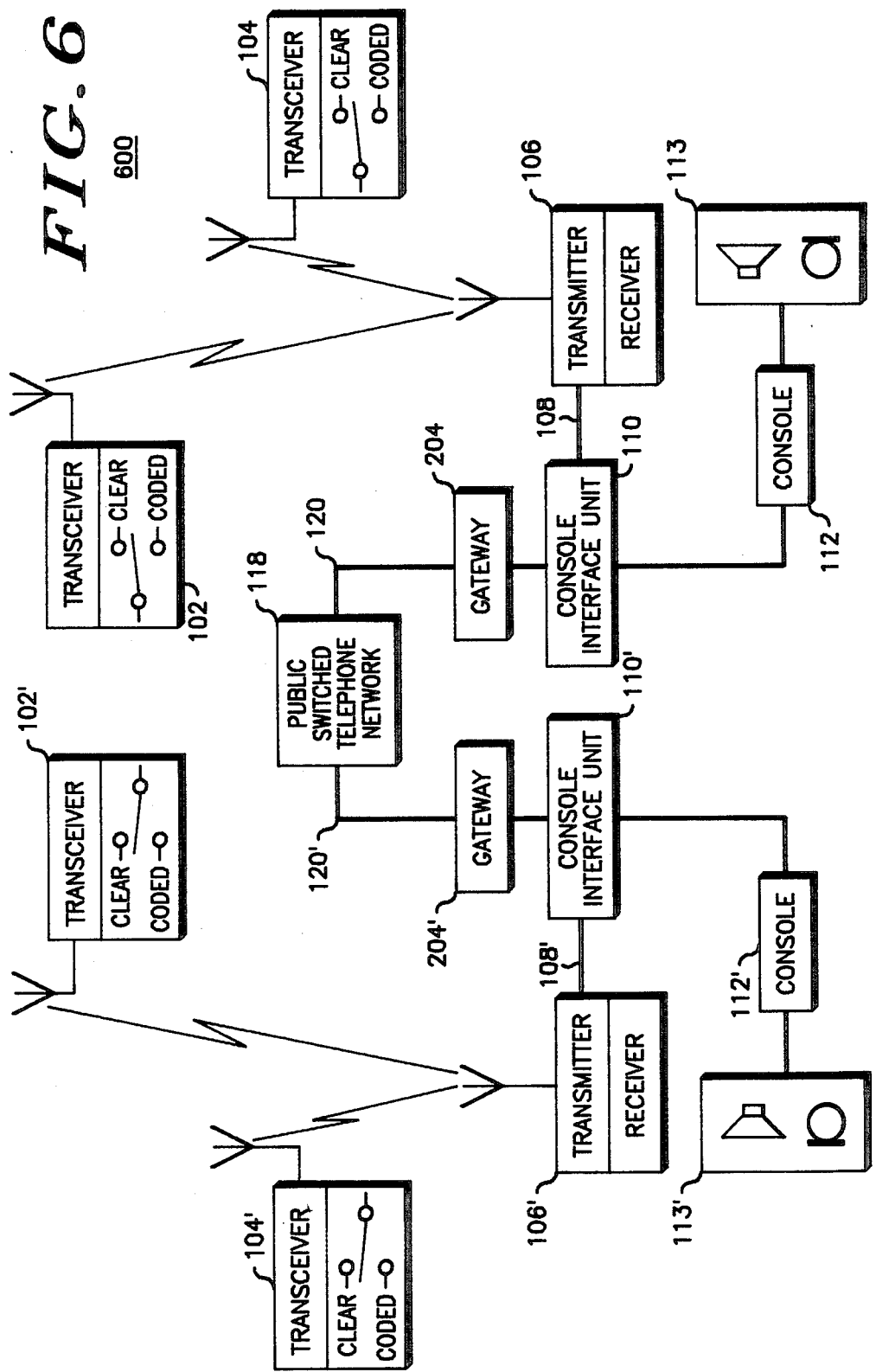

GATEWAY SYSTEM AND METHOD FOR INTERCONNECTING TELEPHONE CALLS WITH A DIGITAL VOICE PROTECTED RADIO NETWORK

BACKGROUND OF THE INVENTION

This invention generally relates to systems and methods for protecting privacy for message signals on a radio communication network. More particularly, an improved method and apparatus is disclosed which allows interconnecting a number of networks which may consist of components operating in an unsecure manner. This improved method and apparatus can accommodate clear or coded message signals, such as clear analog signals or digitally encrypted coded signals, and permits secure end-to-end communications in a system composed of various networks having a mixture of secure and conventional equipment.

The trend of today's communications systems is generally towards requiring more secure communications in order to prevent unauthorized reception and detection of certain sensitive information. In sending sensitive information throughout a communication system, particularly a large system such as used by a Metropolitan Police Department, it is necessary that the signal remain in a secure format while it is being passed through a large number of components. If possible, a secure format should be maintained while the signal is being transmitted from a mobile radio to a base station receiver serving a group of mobile radios within its coverage area, as well as through audio interconnect and patching systems such as those connecting a console unit for a radio network operator or a telephone patch providing interconnect calls to a telephone user via the Public Switched Telephone Network or PSTN. Many analog voice privacy systems have been available for some time, but offer limited security because they use frequency inversion, band splitting, and other types of analog signal scrambling techniques which are easily descrambled due to the limited number of combinations possible. It has been found that a high degree of security is obtained in a digital scrambling system where a voice information signal or clear message signal is first analog-to-digital converted in an A/D converter stage. The outputted digital signals are then encoded into a scrambled form by using shift registers and various gates to produce a pseudo-randomly encoded, or scrambled signal, hereinafter referred to as a coded message signal.

Various digital scrambling systems are available, which have limited usefulness for point-to-point, single path communications such as, for example, from a mobile radio to a mobile radio, from a mobile radio to a base station, or from a base station to another base station. These systems have no facility for multi-network interconnecting. In order for a scrambled message to be transmitted throughout a system composed of a mixture of the above networks, it is often necessary to unscramble, or decrypt, the coded message signal into the original clear message signal before again encrypting. This may provide a potential access point for an intruder into an otherwise secure communication network. Furthermore, when it is desirable to change the encryptor/decryptor code keys in such a system, it is necessary to insert the new codes at each equipment site. This is an inconvenient and time-consuming procedure.

Scramblers for radio communication networks are generally considered accessories to the units in such networks, and do not readily adapt themselves to full network operation. Moreover, portable radios have not been widely adapted for use in protected communication systems. Often times, these portable radios must be used with satellite receiver voting systems in which the best received signal is selected from a plurality of receive only sites serving a base station in a central location. Digital scrambling systems are generally not compatible with the analog voting system capabilities used in some satellite receiver systems of the known art. Many known art scrambler accessories require signal bandwidths much greater than available on the telephone network or in standard radio communication equipment. These accessories cannot be used in multi-equipment linked networks having standard bandwidths and components.

Another problem in the known art is that because digital scramblers oftentimes do not use standard channel bandwidths for transmitting signals, it is not possible to effectively intermix secure and conventional equipment associated with various single communication networks into a desired integrated system. Thus, separate dedicated radio channels and other channel media are required for coded and clear message signals. Known art digital scrambler systems, therefore, do not lend themselves to automatic transparent operation, that is, automatic coded/clear operation in which the message signal been transmitted is properly handled by the system components regardless of whether the message signal is in a coded or clear form. This is especially true for digital voice protected radio communication networks when interfacing to the Public Switched Telephone Network so as to include predetermined telephone subscribers, since the signalling requirements are different between the two networks.

Finally, many known art digital scramblers used in communications systems consisting of a mixture of various networks are not capable of insuring secure end-to-end communications between a subscriber on one system, such as a mobile radio subscriber, and that on another, such as a telephone subscriber. In order to protect sensitive information being exchanged between subscribers on different networks, it is desirable to have the integrated system automatically determine whether a coded or clear message signal is to be exchanged, independent of which network or which subscriber initiated the call. And yet, in order to maintain compatibility with subscribers having conventional equipment, as well as for ease of operation for those predetermined subscribers having the coded or clear message signal choice, it is desirable to have the integrated system automatically detect standard signalling (such as call progress and DTMF—dual tone multi-frequency signalling) on the telephone network.

Consequently, there exists a need for an improved digital voice protection system and method which permits coded or clear message signals to automatically exchange between different communication networks without an intervening decryption so as to insure secure, end-to-end communications while maintaining compatibility with the conventional equipment bandwidth and signalling constraints associated with each communication network.

SUMMARY OF THE INVENTION

It is an object of the present invention to provide an improved, digital voice protection system arrangement offering secure, end-to-end communications via a plurality of linked communication networks which overcomes the foregoing deficiencies even though each communication network is individually non-secure.

It is a further object of the present invention to provide an improved digital voice protection system arrangement of the foregoing type having automatic message signal determination for routing coded or clear message signals between linked communication networks so as to insure secure, end-to-end communications without an intervening decryption while maintaining compatibility with the conventional equipment bandwidth and signalling constraints associated with each communication network.

In practicing the invention, a digital voice protection Gateway arrangement is provided which links radio and telephone communication networks into an integrated system for handling secure information, and includes a radio communication interface, a telephone network interface, a signal processor, and a supervisory controller. The radio communication network interface includes lines having clear and coded message signals on separate transmit and receive paths. The telephone network interface consists of a telephone line interface having a hook switch circuit, a ring detect circuit, and an audio duplexer, such as a 2-to-4 wire hybrid transformer. The signal processor includes both a half-duplex quadrature-amplitude-modulated modem and analog circuitry which continually monitor the telephone line for their respective signals. The supervisory controller includes peripheral stages which detect the presence of coded or clear message signals and includes a preprogrammed instruction set such that it coordinates the operation of the above three elements to route these message signals in the proper direction. Other linked combinations are also possible, including two radio communication networks joined by a telephone line and utilizing two Gateway devices. Of course, the apparatus of the present invention is also compatible with conventional telephone patches, and a mixed mode of operation is permitted if the system security constraints allow the use of this optional mode.

These and other objects of the present invention will become apparent to those skilled in the art upon consideration of the accompanying specification, claims, and drawings.

BRIEF DESCRIPTION OF THE DRAWINGS

Referring to the drawings, wherein like reference numerals indicate like elements and in which:

FIG. 6 is a block diagram of an alternate system having the advantages of the present invention which depicts two radio communication networks linked by a common telephone network.

DETAILED DESCRIPTION OF THE PREFERRED EMBODIMENT

Figure 1:
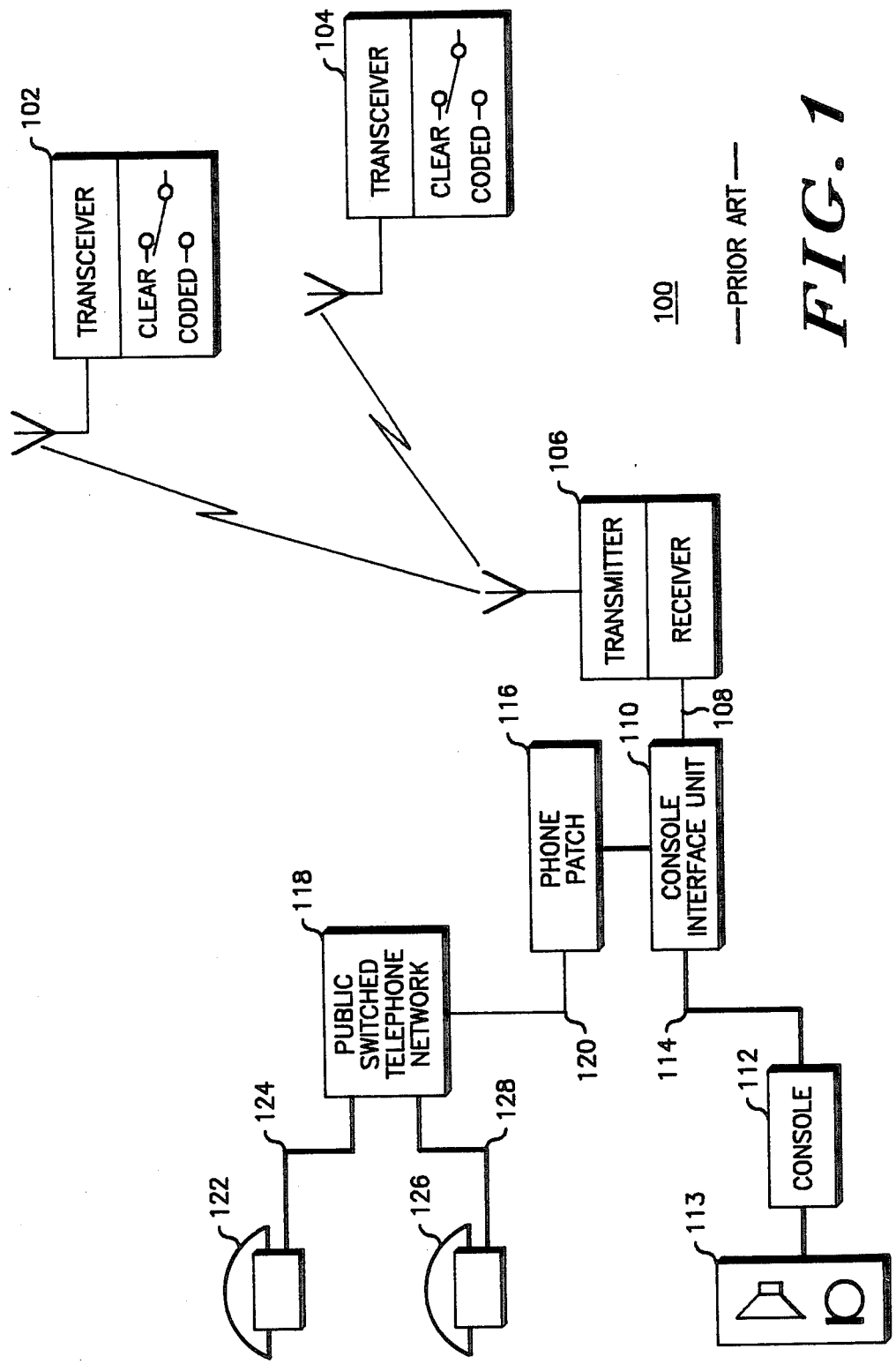
FIG. 1 is a block diagram of a prior art arrangement utilizing a phone patch for linking a secure radio communication network with a telephone network such as a Public Switched Telephone Network.

Referring to FIG. 1, there is illustrated a general communication system 100 having a radio communication network linked with a telephone network. The radio communication network as depicted includes mobile subscriber 102 having a radio receiver and transmitter which includes a clear or coded mode of operation. Likewise, other mobile subscribers may also be operating on the radio network, with one such additional mobile subscriber 104 depicted. These mobile subscribers communicate to a base station 106, which may be a repeater controlled by a network operator. The base station 106 may be located some distance from this network operator and linked via line 108 to Console Interface Unit (CIU) 110, which is generally located in proximity to the network operator's console 112 and including microphone 113 with a push to talk switch, all of which is connected via line 114. Mobile subscriber units 102 and 104 communicate with base station 106, which routes signals via CIU 110 to the network operator at console 112, and together constitute the radio communication network having clear and coded message signal modes. Such networks are well known in the art and may include a clear or coded mode switch for the network operator at console 112, although this is not shown. This radio network may also be interfaced with the PSTN via phone patch 116, but generally such a system can only handle clear message signals over the telephone network, and thus is not considered to be truly integrated. Since coded message signals on the radio network must be decrypted or encrypted before interfacing with the PSTN, this represents a possible security breach. Phone patch 116 interfaces with the PSTN 118 by way of telephone line 120. Telephone subscriber 122 may make or receive calls in the conventional way via the switched telephone network 118 and telephone line 124. Or, another telephone subscriber such as subscriber 126 may make or receive a call to the radio network operator via telephone line 128 and Public Switched Telephone Network 118 in the usual way.

Figure 2:
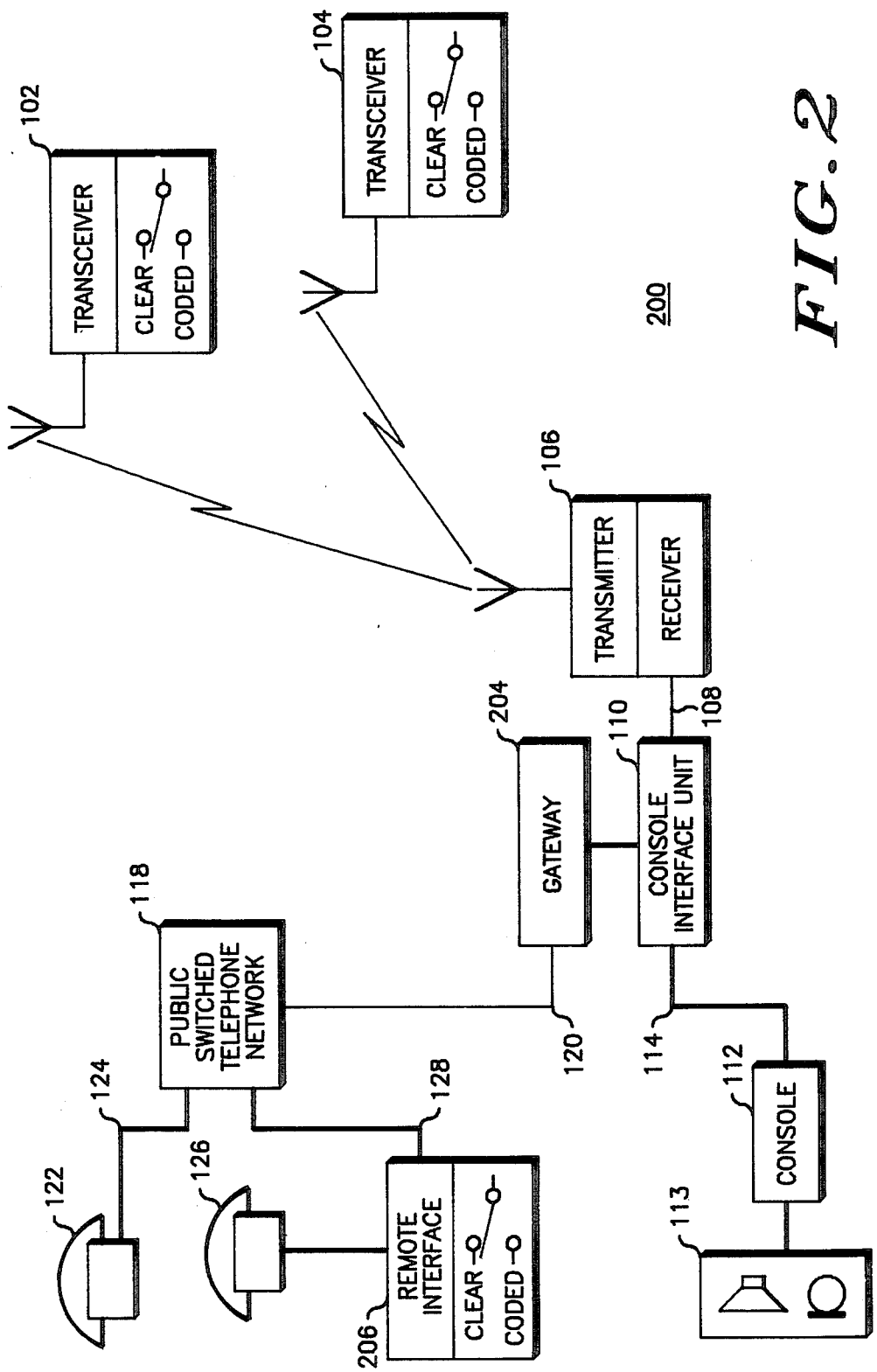
FIG. 2 is a block diagram embodying the present invention which integrates a radio communication network with a telephone network to form a secure communication system.

Referring now to FIG. 2, there is shown at 200 a secure communication system which integrates a radio communication network and a telephone network to be programmable to system needs. It is capable of automatically routing coded as well as clear message signals, such that information may be exchanged end-to-end without an intervening decryption of coded message signals. In this preferred system arrangement, the radio communication network utilizes a multi-step encoding process known as the Motorola Digital Voice Protection Method. This is a method that converts an electrical analog of a voice signal into a digital bit stream by a type of A/D conversion known as CVSD, or continuously-variable-slope delta modulation. The digital bit stream is then scrambled or encrypted by a method in which only the sender and predetermined authorized receivers are given keys. The basic concepts of this method are set forth in U.S. Pat. No. 4,167,700, which is assigned to the assignee of the present invention. This patent is incorporated here by reference as if set forth fully herein, and describes a system utilizing two-way radios which are able to listen to clear or coded message signals on its channel and which are able to respond with a clear transmission. Moreover, it is sometimes desirable in large systems to maintain different levels of security. A network operator, for example, may wish to deliver scrambled message to one user or a set of users on the radio network without communicating with another set of users on the same channel. One such method is described in U.S. Pat. No. 4,440,976 assigned to the assignee of the present invention. This patent is incorporated herein by reference as if set forth fully below. In order to implement the secure communication system depicted at 200 in FIG. 2, Gateway 204 is necessary between the radio communication network and the Public Switched Telephone Network, and Remote Interface 206 is needed at each predetermined telephone subscriber that is authorized to receive coded message signals.

Figure 3:
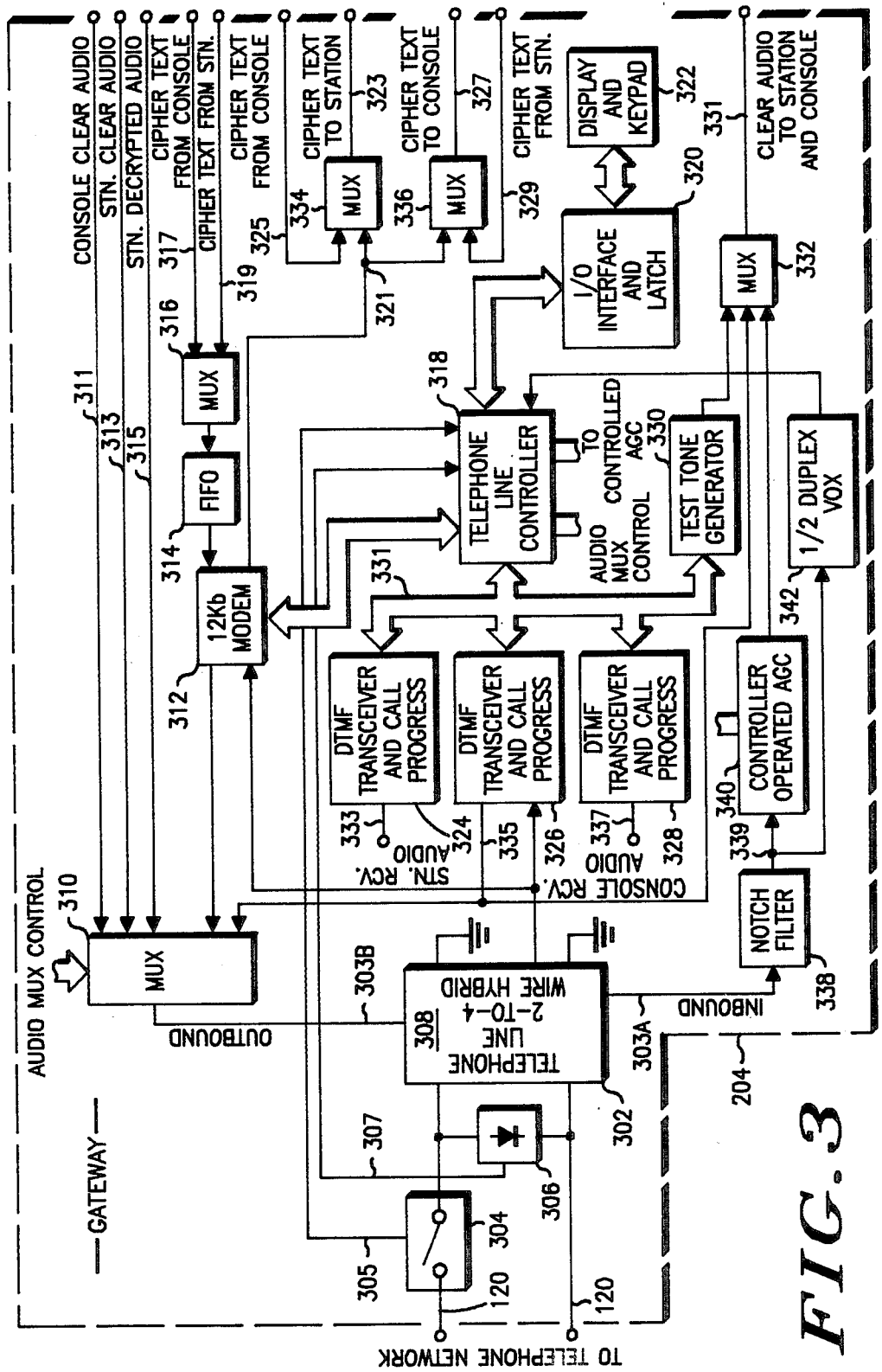
FIG. 3 is a more detailed block diagram of the Gateway device of the present invention as represented in functional form in FIG. 2.

Referring to FIG. 3, a more detailed block diagram for Gateway apparatus 204 is shown. The Gateway utilizes telephone network interface circuitry, given by 2-to-4 wire hybrid 302, to interface to the telephone network. Hybrid 302 provides separate inbound and outbound signals to the telephone network on lines 303a, and 303b. Also included are solid state hook switch 304, and ring detect circuit 306. Each of these circuits 304 and 306 is connected via respective lines 305 and 307 to the supervisory controller which will be discussed later. This telephone line interface may utilize a hybrid transformer 308 to effect the separate inbound and outbound signal paths.

Concentrating first on the outbound signal path 303b, note that multiplex switch (MUX) 310 permits one of five different signals to be selectively chosen by a supervisory controller as the message signal on the outbound path to the telephone network. These five sources are described as Console Clear Audio on line 311, Station Clear Audio on line 313, Station Decrypted Audio on line 315, a tone generator which will be described later, and Cipher Text coming from the console or the station via lines 317 and 319, respectively. It is important to note that the first four inputs to MUX 310 are classified as clear audio or analog signals, while the latter two inputs describe sources of coded message signals. These latter two inputs include several intervening stages before sending signals on outbound path 303b to the telephone network. More particularly, these blocks include a half duplex 12 kilobit modem 312, such as available from Motorola (UDS #2092665), a first in first out (or FIFO) buffer 314, and MUX 316. The FIFO adjusts data and clock components of the message signal from a source and provides a stable reference clock for the modem in transmit mode. At this point it is important to understand that both multiplex switch 310 and multiplex switch 316 are utilized by the supervisory controller to connect the proper source of message signal from the radio communication network to the outbound signal path 303b and ultimately to the telephone network. Thus, multiplex switch 310 selects either a coded or a clear message signal source, while MUX 316 selects which of the two sources of coded message signal are routed to the telephone network.

The supervisory controller consists of a group of functional blocks beginning with Telephone Line Controller 318. This is a microcontroller, such as a Motorola 68HC11, which has programmable as well as fixed instruction sets included. Certain operational functions and features may be locally programmed by the network operator by means of interface stage 320 with display and key pad stage 322. Telephone Line Controller 318 is also connected to a number of tone generators and receivers. Specifically, there is a dual tone multifrequency (or DTMF) transceiver and call progress tone device for each of the possible message signal sources, including DTMF transceiver 324 for the RF station, DTMF transceiver 326 for the telephone network, and DTMF transceiver 328 for the console. There is also a test tone generator 330, mentioned earlier, which is operable by Telephone Line testing of the complete integrated system. Multiplex switch 332 provides clear audio output to the station and to the console via line 331, and one of the inputs to MUX 332 is from the test tone generator 330. Also included as an input to MUX 332 is the output from DTMF transceiver 326. While the clear audio output consists of a single line, 331, the coded message signal path through the Gateway device is more complex.

Concentrating next on the inbound signal path 303a, a coded message signal from the telephone network proceeds into the Gateway to half duplex modem 312 which is normally in the receive mode and which outputs a bit stream on line 321. From this line, the bit stream is routed to MUX 334 and MUX 336 for eventual routing to the station or to the console, respectively. The bit stream or ciphered text available on line 321 is then routed to the station via line 323 under control of MUX 334. The other source of ciphered text that may be routed to the station is from the console via line 325. Similarly, MUX 336 is able to route ciphered text to the console via line 327 which may be sourced from either the telephone network via line 321 or from the station via line 329. As a result, it should be obvious that lines 323, 325, 327, and 329 constitute the ciphered text interconnections between the Gateway and the Console Interface Unit, CIU. Moreover, all of the decryption and encryption stages are within the CIU. Line 331 constitutes the clear audio path between the Gateway and the CIU. Because of special control signaling utilized by the Gateway, the clear audio path preceding line 331 must include a notch filter 338. This notch filter has a center frequency of approximately 300 Hz, which is the approximate frequency of a connect tone to be described in more detail later. The output of notch filter 338 represents a filtered signal that has the connect tone removed so as to provide a filtered signal at point 339 which is essentially the desired clear audio. Moreover, because the telephone network exhibits highly-variable characteristics which are dependent on distance and line characteristics, a controller-operated AGC stage 340 was needed to provide a consistent audio level which then could be interfaced with the radio communication network. The output of the controller-operated AGC 340 is connected to MUX 332, as shown in FIG. 3. Again, it is important to note that MUX 332, 334, and 336 are all under control of Telephone Line Controller 318. The filtered signal at point 339 is also utilized to drive half duplex VOX circuit 342 which permits the telephone line controller 318 to sense when the telephone subscriber begins talking. This VOX circuit is used for the clear mode only, to allow the telephone subscriber to switch the repeater from the receive mode to the transmit mode. Telephone Line Controller 318 also supervises telephone line 120 and automatically connects to the telephone network by utilizing ring detect circuit 306 and hook switch circuit 304. These two circuits permit the Gateway to detect a ringing signal and then answer by permitting loop current to flow. In this manner the Gateway acknowledges that it is being called by a telephone subscriber. Moreover, DTMF transceiver and call progress tone device 326 has its input connected to inbound signal path 303a and can therefore detect various call progress tones, such as line busy or line dropped, as they occur. And when initiating a call to the telephone network, Telephone Line Controller 318 is able to utilize DTMF transceiver and call progress device 326 to generate the desired telephone subscriber's number in tone format, directing it through MUX 310 to the outbound signal path 303b, ultimately to the telephone network.

In considering the overall system operation of the Gateway 204 it is important to note a few assumptions which are programmed into Telephone Line Controller 318 and which constitute the default mode, unless specifically modified in some way. The first of these priorities is known as the push-to-talk (PTT) priority that is necessary on a half duplex system and is established as:
1. Console PTT;
2. Telephone line PTT (VOX in clear mode, and modem carrier detect in ciphered text mode); and
3. A radio subscriber's PTT. The latter two can be reversed under programmable control and thus, a subscriber having a higher priority is able to preempt a subscriber of lower priority in competing for system resources of the radio communication network. In addition, various timeout timers may be utilized to limit interconnect call activity. Several possible timeout timers include one which detects no patch activity, operating at the lowest level of priority, and another timeout timer due to patch activity for too long a period, or due to detection of line busy or line disconnect call progress tones operated at the highest level of priority. Such timeouts would act to disconnect the Gateway and cause it to be reset.

With these assumptions in mind, when a telephone subscriber initiates a call with the intention of sending a message signal in clear text mode, the telephone subscriber dials the Gateway's telephone number. The Gateway answers after a programmable number of rings and establishes the connection to the radio network. In the event that a radio subscriber replies in ciphered text as opposed to clear text, any other radio subscribers operating on the same key as well as the console operator will be able to decrypt and understand the message signal. The telephone subscriber, however, will hear a low-level ciphered text coded message signal. This message signal is discernible to the telephone subscriber only as noise. If the radio subscriber has replied in clear mode, the clear message signal will be passed between the telephone subscriber and the radio subscriber in the usual way. In any event, the Gateway will disconnect when either the telephone subscriber goes on hook, or the Gateway receives a DTMF disconnect tone sequence.

Next, if a radio subscriber initiates a call in clear text mode by keying up in clear with the Gateway access DTMF sequence, the Gateway will respond with dial tone. The radio subscriber may then directly dial the number to be called, or access a speed-dialing menu. The programming within the controller 318 could terminate the call attempt if three busy call progress tones are detected, for example. Otherwise, the call proceeds as in the previous paragraph.

If ciphered text operation is desired, a telephone subscriber dials the Gateway number as before. The Gateway answers after a programmed number of rings and establishes the connection to the radio system. Upon selecting the ciphered text mode, the telephone subscriber initiates a "long" train signal. The "long" train is employed only at the initial call setup. Its purpose is to adjust an adaptive equalizer within the modem to the specific line conditions for this call. An additional purpose is to knock down the echo cancellers in the PSTN to permit passage of high speed digital data. In the preferred embodiment the "long" train requires approximately 4 seconds in each direction. The Gateway then replies upon completion with its long train. Both the console operator and the radio subscribers will hear a low-level "modem progress tone" during the interval when these two long trains take place. This modem progress tone lasts approximately 7-8 seconds, and because it is at the lowest priority level for PTT access, it may be preempted by anyone's PTT transmission. A high priority level "train complete tone" advises all concerned on the secure communication system that the cipher patch is complete. A 300 Hz signal is utilized as the connect tone to keep the echo cancellers inactive while in this mode. Thereafter, all predetermined authorized radio subscribers must select the cipher text mode in order to communicate with the telephone subscriber who is operating in the ciphered text mode. A "fast" train occurs at the beginning of each transmission and lasts for approximately 50 milliseconds. Its purpose is to establish carrier and baud sync for the receiver within the modem. Coded message signals may therefore be exchanged back and forth in the normal way. If a telephone subscriber's cipher text mode transmission is interrupted by a higher priority PTT, the higher priority is immediately heard over the air, but the Gateway delays transmitting on the telephone line until a drop in modem carrier detect is heard. This enables the telephone subscriber's Remote Interface to always receive the "fast" train. Termination of the call is by timeout timer, a knock down DTMF sequence, or call progress tones, such as line dropped or dial tone. For security reasons, a reverting back to clear mode is not possible at this point, which would constitute a mixed mode f operation. If a telephone subscriber accidentally hits the switch from coded to clear while in the ciphered text mode during communication with the Gateway, he will be heard by the console operator or radio subscriber community. However, if a radio subscriber changes to the clear mode after a subscriber has set up the Gateway in coded mode, the radio subscriber will not be heard by the telephone subscriber. The ability of this system to remain in a coded mode of operation is desirable for system security reasons so that a Gateway signal bound for the telephone network will not be inadvertently decrypted by a subscriber's error.

Figure 4:
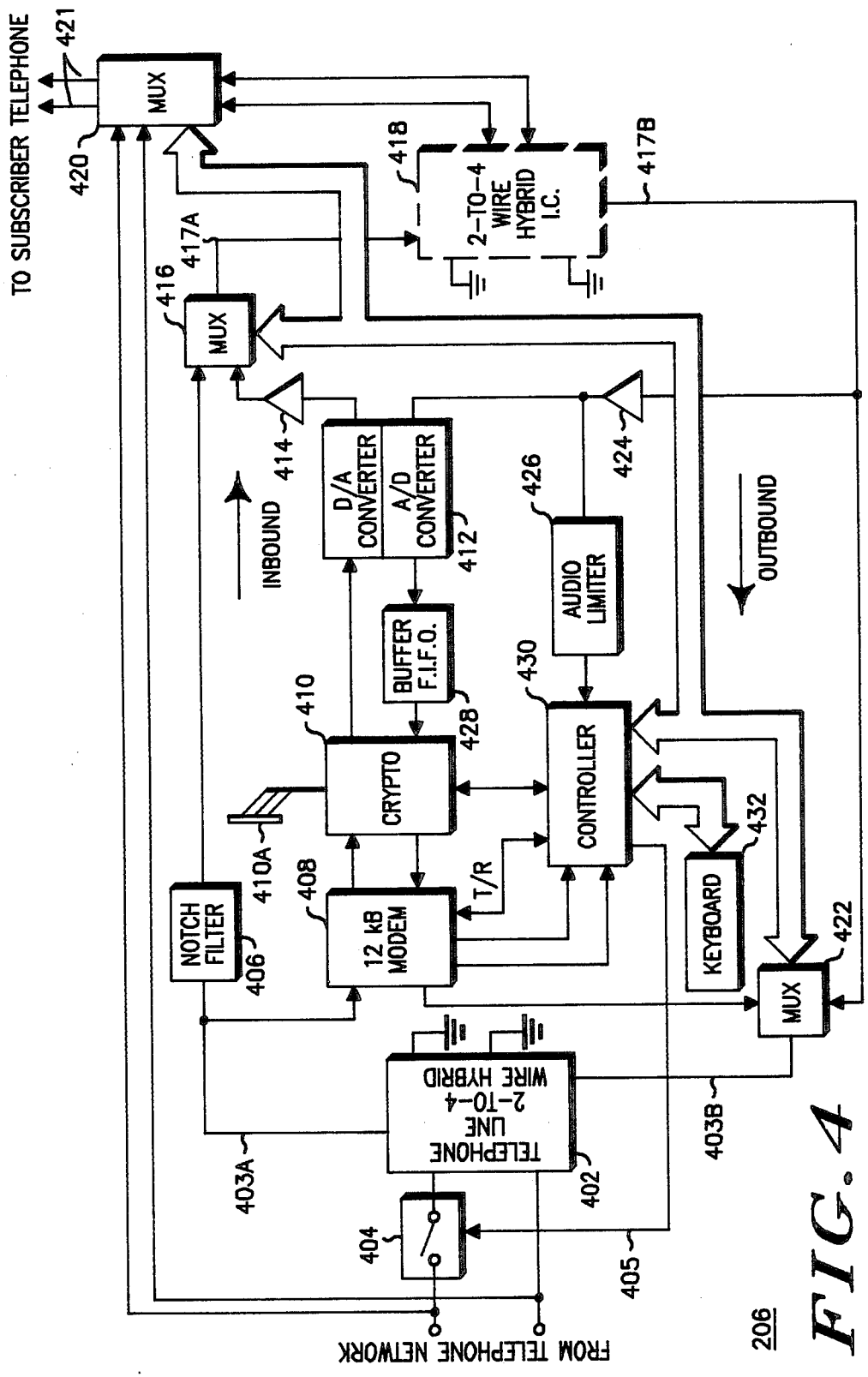
FIG. 4 is a more detailed block diagram of the Remote Interface, or telephone terminal, of a predetermined telephone subscriber which is useful in conjunction with the present invention.

Referring to FIG. 4, the Remote Interface 206 which interfaces a subscriber telephone to the telephone network is shown. This device is somewhat similar to the Gateway in that it utilizes separate inbound and outbound signal paths and a controller coordinating the signal routing and operation of a half duplex modem. However, the Remote Interface also includes encryption and decryption stages and a "deadman" circuit which bypasses the Remote Interface circuitry altogether upon detecting a power failure. Beginning at the telephone line interface from the telephone network, a 2-to-4 wire hybrid 402 is shown which provides the separate inbound and outbound signal paths 403a and 403b, respectively, from the single telephone line. Also included is hook switch circuit 404 which has a connection line 405 to the controller that will be discussed shortly. The inbound signal path 403a splits into two paths, one of which is the clear message signal path through notch filter 406. The other path proceeds to half duplex 12 kilobit modem 408 which outputs a signal to crypto stage 410. A key loader interface plug 410a like that incorporated on DVP equipped subscriber radios is included at this stage for programming a new key number into storage registers for encrypting as well as decrypting in crypto stage 410. The output of the decryptor within crypto stage 410 proceeds to conversion stage 412 which includes a D/A converter whose output feeds buffer stage 414. Buffer stage 414 output and the clear signal output from stage 406 are connected to MUX 416 which is operated by the controller to provide an output signal 417a. This output signal is directed through 2-to-4 wire hybrid integrated circuit 418 to multiplex switch 420 which has a second input via lines 419 from the telephone network. This second input provides a bypass path through the Remote Interface for the telephone subscriber. The subscriber's telephone interconnects with the Remote Interface 206 by means of lines 421. When the telephone subscriber speaks, his message signal proceeds via lines 421 through MUX 420 to block 418 which provides a separate transmit path via line 417b to become the outbound signal on the telephone line. His message signal, in analog form, proceeds to MUX 422 as well as buffer stage 424. The output from stage 424 is then converted into a digital signal by means of an A/D converter stage within conversion stage 412, and is applied to audio limiter 426, as well as FIFO buffer stage 428. The FIFO permits VOX operation, or voice-operated-transmit, rather than push-to-talk (PTT) operation, with negligible loss of a message signal by storing the clear message or plain text from the A/D converter within conversion stage 412 during the modem's "fast" train. The output signal from buffer stage 428 is then encrypted within block 410 and then reformatted into quadrature amplitude modulated signals in stage 408. This reformatted signal is applied to a second input of MUX 422 which selects the coded or clear message signal to be sent on outbound signal path 403b as determined by controller 430. Controller 430 supervises the activity of signals inputted to modem 408 via a carrier detect and energy detect pair of lines, and controls the transmit or receive mode of modem 408 by a direct control line. Controller 430 is also subscriber programmable by means of keypad and indicator block 432.

Figure 5A:
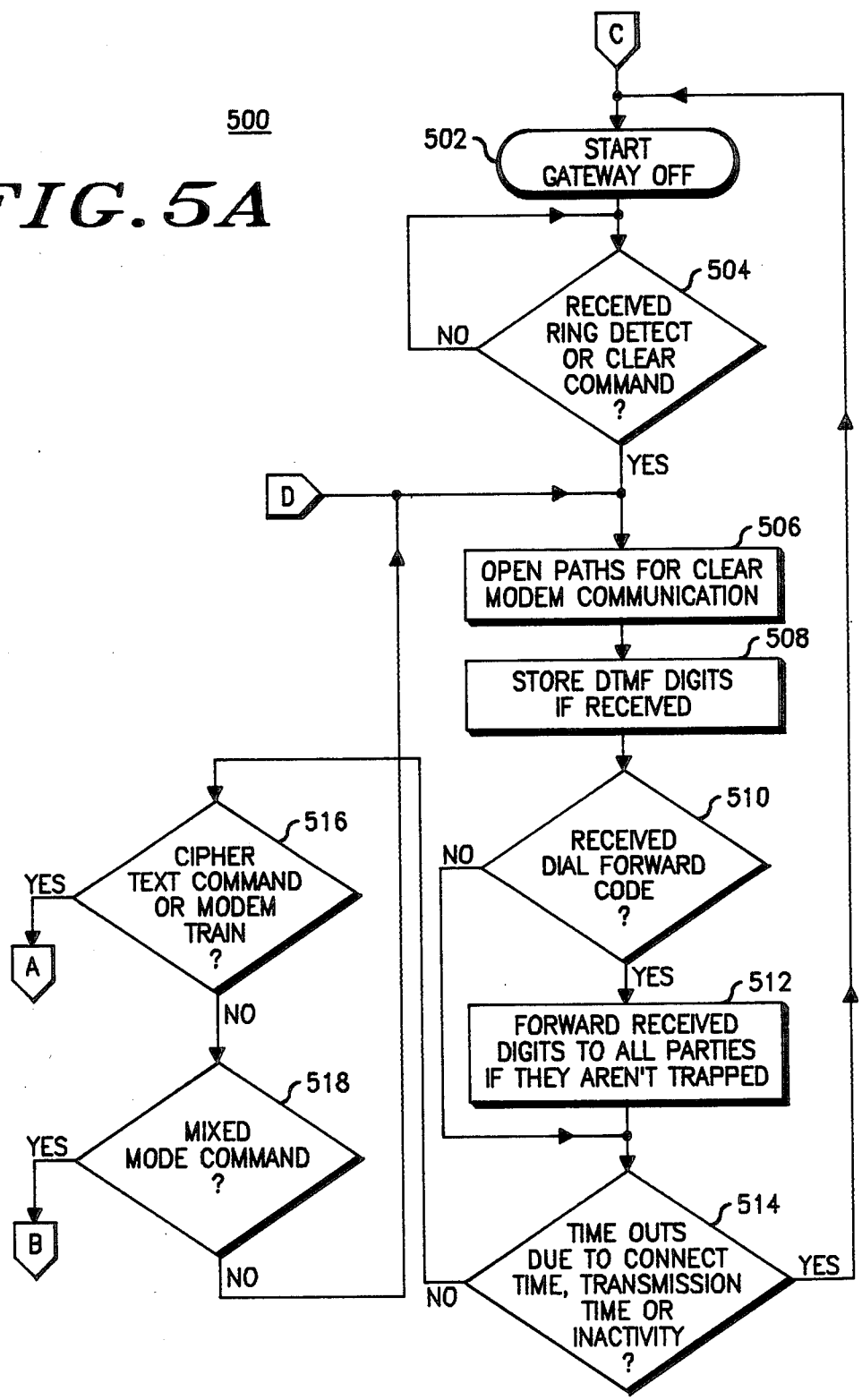
FIGS. 5a, 5b, and 5c constitute a flowchart used by the telephone line controller of the Gateway device of FIG. 3.
Figure 5B:
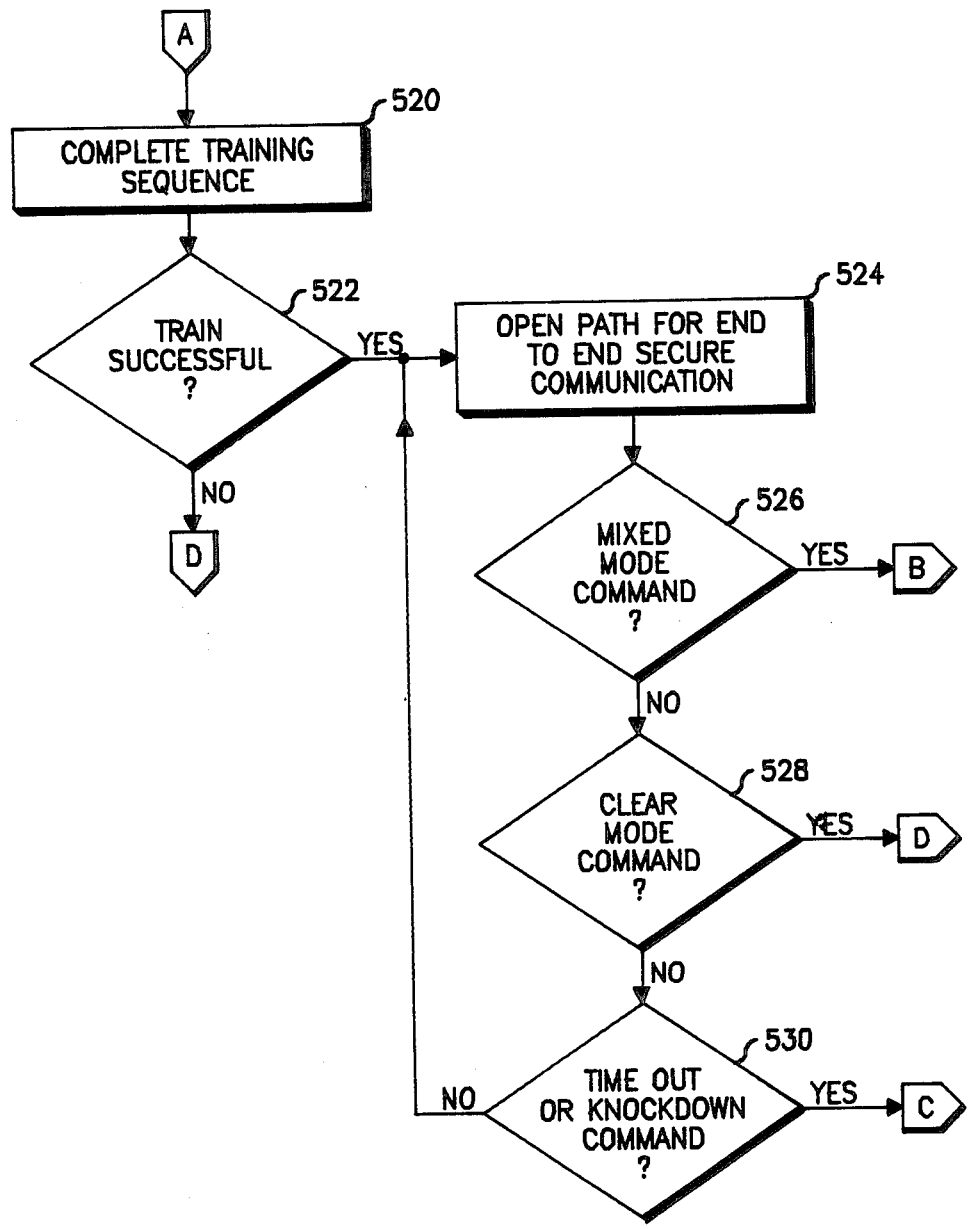
Figure 5C:
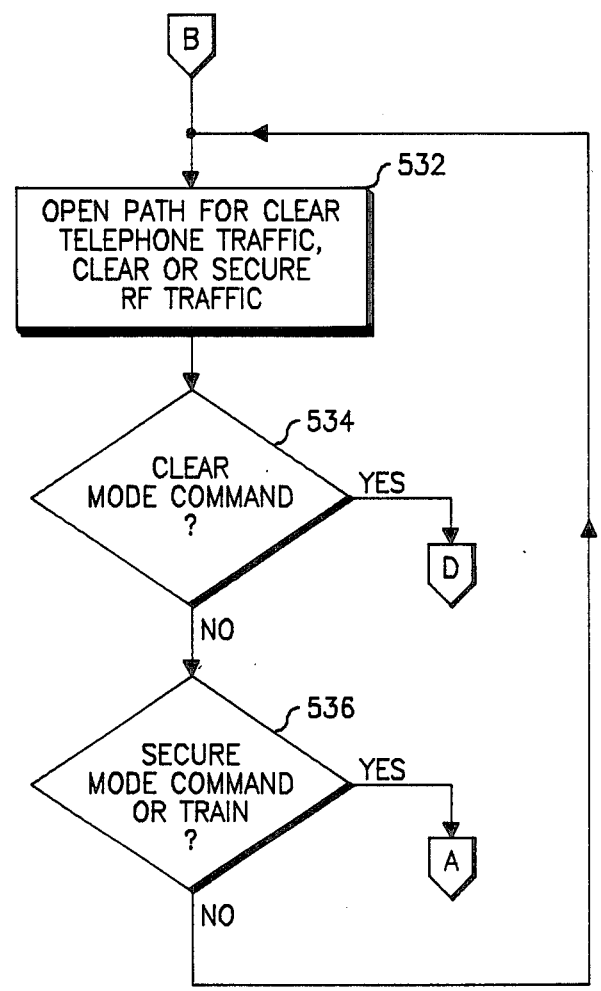

Turning now to FIG. 5a, 5b, and 5c, the flowchart for the Gateway depicts the various modes of operation and the conditions which must be detected or met before changing from one mode to another. Beginning at the starting point 502, the Gateway's controller idles in a standby mode in which the secure phone patch is off. Next, in block 504, it checks to see whether it has received ring detect or a clear command. If the answer is NO, the controller remains in the idle mode. If the answer to block 504 is YES, it then proceeds to block 506 which provides an open path for clear mode communication. Proceeding to block 508, it stores DTMF digits, if received, and if this option is programmed into the Gateway. Next, in block 510 it checks to see if it has received a dial forward code. If the answer is YES, it proceeds to block 512, which forwards the received digits to all parties if they are not trapped by the Gateway. Next, it proceeds to block 514, which is the same block it would have proceeded to if the answer to block 510 was NO. Block 514 checks to see whether connect time, transmission time, or inactivity have exceeded their normal timeout limits. If the answer is YES, the controller proceeds back to the starting block 502. If the answer to block 514 is NO, the controller next checks to see whether cipher text command or modem train has occurred in block 516. If the answer is NO, it proceeds to block 518, which checks to see whether a mixed mode command was given. If the answer was NO, the controller proceeds to block 506 and continues on in the previously described way. If the answer to block 516 had been YES, the controller proceeds via step A to block 520, which allows a complete training sequence to occur. It then checks in block 522 whether the training sequence was successful. If it was not, the controller proceeds via step D to block 506 and continues in the usual manner. If the answer to block 522 is YES, the controller proceeds with an open path for end-to-end secure communication in block 524. It next checks to see whether a mixed mode command was given at block 526, and if it has not, it proceeds to block 528, which checks to see whether a clear mode command was given. If the answer is YES, it proceeds via block D to block 506 and continues in the usual way. If the answer to block 528 is NO, it next checks in block 530 to see whether a timeout or knockdown command was given. If the answer is NO, it proceeds back to block 524 permitting open path or end-to-end secure communication. If the answer to block 530 is YES, then the controller proceeds back to the initial starting block 502. Going back to block 526, if a mixed mode command was given, and such an option is authorized on the system, the controller would proceed via block D to block 532. The Gateway would then establish an open path for clear telephone traffic and clear or secure RF communication traffic. It would then check in block 534 whether a clear mode command was given subsequent to the establishing of the open path in block 532. If the answer is YES, the controller would proceed via block D back to block 506 and continue on in the clear mode. If the answer to block 534 is NO, it then proceeds to block 536 to check whether a secure mode command or long train was received. If the answer is YES, the controller proceeds via block A to block 520, permitting a complete training sequence. However, if the answer to block 536 was NO, it proceeds back to block 532 and maintains the open path for clear telephone traffic and clear or secure RF communication traffic.

FIG. 6 depicts an alternate embodiment of the present invention, showing a secure communication system consisting of two radio communication networks linked via the PSTN and providing secure end-to-end communications without an intervening decryption of each particular message signal. A first radio communication network is shown having mobile subscriber 102 and 104 communicating with a base station 106 coupled via line 108 to a Console Interface Unit 110 having a console 112 and a console microphone 113 for a network operator for the system. Coupled to Console Interface Unit 110 is Gateway 204 which links the radio communication network to the telephone network via telephone line 120. In similar fashion, a second radio communication system is shown having mobile subscribers 102' and 104' communicating message signals with base station 106' linked to Console Interface Unit 110' via line 108' and having a console 112' and a console microphone 113'. This network also has its own Gateway 204' which couples the Console Interface Unit 110' to the Public Switch Telephone Network 118 via telephone line 120'. The system depicted at 600 in FIG. 6 operates much the same way as the system of FIG. 2, permitting any subscriber to call another subscriber and conduct an exchange of message signals in either clear or coded mode.

In summary, each of the above mentioned arrangements is able to accomplish secure end-to-end communications between subscribers operating on different, but linked communication networks. Each subscriber is able to initiate a call in clear mode, and then has the choice of continuing the call in clear mode or selecting a coded message signal mode in which only predetermined authorized subscribers are able to participate. Moreover, only one such subscriber needs to select the coded message signal mode while all of the intended listeners equipment will automatically follow. Thus, each of these arrangements utilizing the apparatus and method of the present invention is able to overcome the limitations of the known art.

Although these arrangements of the present invention fully disclose many of the attendant advantages, it is understood that various changes and modifications not depicted herein are apparent to those skilled in the art. Therefore, even though the form of the above-described invention is merely a preferred or exemplary embodiment given with a suggested alternative, further variations may be made in the form, construction, and arrangement of the parts without departing from the scope of the above invention.

I claim:

1. A secure communications system for a plurality of mobile and fixed subscribers, with at least one fixed subscriber accessible on a conventional telephone via a telephone network having a telephone communication channel with a first bandwidth and signalling requirement, wherein clear analog or encrypted digital message signals are exchanged end-to-end automatically, the system integrated to comprise in combination:
   a radio communication network having a radio communication channel with a second bandwidth and signalling requirement, which second bandwidth and signalling requirement is different from said first bandwidth and signalling requirement, said radio communication network including a control console, a console interface unit, a base station, and a plurality of subscriber radios operating thereon, for exchanging clear analog or encrypted digital message signals among subscribers;
   remote interface means, co-located with the fixed subscriber's conventional telephone for alternately handling clear or encrypted message signals in a first or second mode with other predetermined subscribers; and
   gateway means, coupled to said radio communication network and to the telephone network, for automatically remotely controlling the mode of said remote interface means as well as for processing said message signal compatibly with said first and second bandwidth and signalling requirements without an intervening decryption.

2. The secure communications system according to claim 1, wherein said remote interface means comprises in combination:
   (a) telephone network interface means for providing separate inbound and outbound signal paths from a single line;
   (b) telephone interface means for providing separate inbound and outbound signal paths to the conventional telephone;
   (c) signal converting means for accommodating either a clear or encrypted message signal on the inbound and outbound signal paths between (a) and (b) above; and
   (d) mode selecting means for electrically selecting clear or encrypted signal paths for the inbound and outbound signal paths through (c).

3. The secure communications system according to claim 2, wherein said telephone network interface means includes an audio duplexer, such as a 2-to-4 wire hybrid transformer, as well as a hook-switch circuit and ring detect circuit.

4. The secure communications system according to claim 2, wherein said telephone interface means includes a 2-to-4 wire hybrid semiconductive circuit, such as an MC-3419, which also provides loop current to the conventional telephone.

5. The secure communications system according to claim 2, wherein said signal converting means in the first mode comprises:
   a. an inbound signal path including:
      i. a clear analog path having a low frequency notch filter and a first controllable multiplex switch;
      ii. a half-duplex modem for monitoring signals input to said low frequency notch filter; and
   b. an outbound signal path including:
      i. a clear analog path having a second controllable multiplex switch.

6. The secure communications system according to claim 2, wherein said signal converting means in the second mode comprises:
   an inbound signal path including:
      a. a half-duplex modem in a receive mode for recovering cipher text from the encrypted digital signal;
      b. a decryptor for recovering plain text from the cipher text from said half-duplex modem;
      c. a D/A converter stage for recovering an analog signal from the plain text from said decryptor;
   an outbound signal path including:
      d. an A/D converter stage;
      e. an encryptor for converting the plain text from said A/D converter stage into cipher text; and
      f. a half-duplex modem for converting the cipher text into an outbound encrypted digital signal.

7. The secure communications system according to claim 6, wherein said half-duplex modem includes a modulator/demodulator having a quadrature amplitude modulated signal format quantized at 5 bits per baud with a data rate such as 12 kilobits per second and outputting carrier detect and energy detect signals.

8. The secure communications system according to claim 2, wherein said mode selecting means includes a keypad with indicators, an I/O interface with latch, and a microcontroller, which is remotely operable by said gateway means via carrier detect and energy detect signals and locally operable by said predetermined subscriber.

9. The secure communications system according to claim 2, wherein said mode selecting means includes a multiplex switch for providing a bypass, straight-through mode in the event of power failure.

10. The system according to claim 1, wherein said gateway means comprises:

(a) radio communication network interface means for providing clear and encrypted message signals on separate transmit and receive paths from said radio communication network;

(b) telephone network interface means for providing separate inbound and outbound signal paths to a single telephone line;

(c) signal processing means interposed between the radio communication network interface means and the telephone network interface means for selectively routing message signals therebetween; and (d) supervisory control means for automatically controlling the radio communication network interface means, the telephone network interface means, and the signal processing means.

11. The secure communications system according to claim 10, wherein said telephone network interface means includes an audio duplexer, such as a 2-to-4 wire hybrid transformer, as well as a hook-switch circuit and a ring detect circuit.

12. The secure communications system according to claim 10, wherein said signal processing means comprises:

a half-duplex modem having a receive and transmit mode;

a first signal multiplexing switch coupled to one output of said half-duplex modem;

a FIFO storage register providing a buffer between said radio communication network interface means and said half-duplex modem before coupling to said telephone network interface means for cipher text signals; and a second signal multiplex switch ahead of said FIFO storage register.

13. The secure communications system according to claim 12, wherein said half-duplex modem includes a modulator/demodulator having a quadrature amplitude modulated signal format quantized at 5 bits per baud with a data rate such as 12 kilobits per second and outputting carrier detect and energy detect signals.

14. The secure communications system according to claim 10, wherein said supervisory control means comprises:

a controllable AGC circuit and a VOX circuit, both coupled to a notch filter on the inbound signal path to said telephone line;

a plurality of DTMF transceivers having call progress tones for control functions; and a microcontroller, such as an 68HC11 microprocessor, utilizing the plurality of DTMF transceivers for providing a telephone line controller which utilizes the VOX circuit for providing automatic switchover capability from receive to transmit for said signal processing means when the fixed subscriber begins talking.

* * * * *